US009821281B2

United States Patent
Ray et al.

(10) Patent No.: US 9,821,281 B2
(45) Date of Patent: Nov. 21, 2017

(54) EDUCTOR BASED MIXER FOR MIXING STUCCO AND WATER

(71) Applicant: UNITED STATES GYPSUM COMPANY, Chicago, IL (US)

(72) Inventors: Suman Sinha Ray, Chicago, IL (US); Louis P. Stocco, Lake Villa, IL (US); Kumar C. Natesaiyer, Grayslake, IL (US); Ronald E. Schenck, Valparaiso, IN (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

(21) Appl. No.: 14/670,228

(22) Filed: Mar. 26, 2015

(65) Prior Publication Data

US 2015/0298073 A1 Oct. 22, 2015

Related U.S. Application Data

(60) Provisional application No. 61/981,324, filed on Apr. 18, 2014.

(51) Int. Cl.
*B01F 3/00* (2006.01)
*B01F 15/00* (2006.01)
(Continued)

(52) U.S. Cl.
CPC ............... *B01F 3/12* (2013.01); *B01F 3/06* (2013.01); *B01F 5/043* (2013.01); *B01F 5/0405* (2013.01);
(Continued)

(58) Field of Classification Search
CPC ....... B28C 5/4231; B28C 5/4237; B01F 3/12; B01F 15/0238; B01F 15/00357
(Continued)

(56) References Cited

U.S. PATENT DOCUMENTS 1,486,883 A  3/1924  Halliburton
1,731,953 A * 10/1929 Thomson .............. B28C 5/1261
                                                         366/5

(Continued)

FOREIGN PATENT DOCUMENTS

DE       1509455 A1    1/1969
DE    202006001759    9/2006
(Continued)

OTHER PUBLICATIONS

International Search Report from International Patent Application No. PCT/US2015/025274, dated Oct. 1, 2015.
(Continued)

*Primary Examiner* — Tony G Soohoo
*Assistant Examiner* — Anshu Bhatia
(74) *Attorney, Agent, or Firm* — Greer, Burns & Crain, Ltd.; Pradip Sahu; Philip T. Petti

(57) ABSTRACT

A mixing assembly includes a main flow conduit having an inlet end and an opposite outlet, a source of pressurized air at the inlet end, a container of stucco in fluid communication with the flow conduit, and a source of water in fluid communication with the flow conduit between the outlet and the container. The pressurized air draws stucco from the container into the flow conduit, and also draws water into the flow conduit to form an atomized slurry.

2 Claims, 2 Drawing Sheets

(51) Int. Cl.

| | | |
|---|---|---|
| *B01F 3/12* | (2006.01) | |
| *B01F 15/02* | (2006.01) | |
| *C04B 28/04* | (2006.01) | |
| *B01F 5/04* | (2006.01) | |
| *B01F 3/06* | (2006.01) | |
| *B28C 7/00* | (2006.01) | |
| *B28C 9/00* | (2006.01) | |
| *B28C 5/06* | (2006.01) | |
| *B01F 7/24* | (2006.01) | |

(52) U.S. Cl.
CPC .......... *B01F 5/0471* (2013.01); *B01F 5/0496* (2013.01); *B01F 7/24* (2013.01); *B01F 15/00357* (2013.01); *B01F 15/0238* (2013.01); *B28C 5/06* (2013.01); *B28C 7/0007* (2013.01); *B28C 9/004* (2013.01); *C04B 28/04* (2013.01); *B01F 2003/063* (2013.01); *B01F 2003/1257* (2013.01); *B01F 2215/0047* (2013.01); *B01F 2215/044* (2013.01); *B01F 2215/0427* (2013.01)

(58) Field of Classification Search
USPC .................................................. 366/40, 173.1
See application file for complete search history.

(56) References Cited

U.S. PATENT DOCUMENTS

| | | | |
|---|---|---|---|
| 2,637,539 A * | 5/1953 | Crom | E04F 21/10 366/11 |
| 4,009,062 A | 2/1977 | Long | |
| 4,039,170 A | 8/1977 | Cornwell et al. | |
| 4,077,612 A * | 3/1978 | Ricciardi | B01F 1/00 366/102 |
| 5,922,447 A | 7/1999 | Baig | |
| 6,336,573 B1 * | 1/2002 | Johanson | G01F 13/005 198/661 |
| 6,494,609 B1 | 12/2002 | Wittbold et al. | |
| 7,718,019 B2 * | 5/2010 | Wittbold | B01F 5/0413 106/772 |
| 8,197,952 B2 | 6/2012 | Yu et al. | |
| 8,618,445 B2 | 12/2013 | Dubey et al. | |
| 2007/0241204 A1 | 10/2007 | Ohata et al. | |
| 2008/0160340 A1 * | 7/2008 | Stocco | C04B 28/145 428/689 |
| 2012/0058885 A1 * | 3/2012 | Nebergall | B01F 5/205 502/80 |

FOREIGN PATENT DOCUMENTS

| | | |
|---|---|---|
| GB | 765217 A | 1/1957 |
| WO | 2008135503 A1 | 11/2008 |
| WO | 2013/156792 | 10/2013 |

OTHER PUBLICATIONS

Partial Search from International Patent Application No. PCT/US2015/025274, dated Jul. 13, 2015.

* cited by examiner

EDUCTOR BASED MIXER FOR MIXING STUCCO AND WATER

RELATED APPLICATION

This application claims 35 USC 119(e) priority from U.S. Ser. No. 61/981,324 filed Apr. 18, 2014.

BACKGROUND

The present invention relates to equipment for handling slurries, and more specifically to a mixer used for mixing particulate material, such as stucco or the like, with an aqueous slurry, and often combined with other constituents.

For mixing stucco in water, generally rotary mixers are used. A suitable example of a stucco mixer, of the type used producing gypsum-based products, such as in a wallboard production line, is described in U.S. Pat. No. 6,494,609 incorporated by reference. These mixers, employing a rotating impeller to mix the slurry, are dimensionally quite large, which makes the operation inconvenient. A common problem with conventional mixers is that since the velocity of the slurry within the mixer is not uniform, there is a tendency for slow flowing slurry at the periphery of the mixer to prematurely set. This premature setting causes clogging or disruption of the desired high velocity, steady flow of the slurry, in some cases resulting in stopping the whole production line and thereby causes significant loss of revenue.

While mixing, due to the fluid dynamic conditions, the shear is not equally distributed across the slurry. Besides, residence time during mixing is low (~3 seconds) owing to the demand of the production line. In some cases, this problem is addressed by adding pins to the mixer. However, this has not been an effective solution. Because gypsum slurry is a shear thinning fluid, upon application of higher shear, the viscosity of the slurry decreases. The relationship governing the viscosity ($\mu$), shear rate ($\gamma$) is given as $$\mu = k\gamma^{n-1} \tag{1}$$

where n<1 and k is the flow consistency index. According to this formula, an application of high shear rate can dramatically reduce viscosity. This relationship also illustrates the possibility of the usage of slurry with a low water:stucco ratio by reducing the effective viscosity at a very high shear rate.

Another aspect of conventional stucco technology is that a hopper providing the powdered stucco, gypsum or dry wallboard ingredients should not prematurely contact water prior to entering the mixer. If such premature contact occurs, the tube or passageway used to transmit the dry ingredients to the slurry can become clogged, also interfering with slurry production. Thus, there is a need for an improved slurry mixing apparatus for creating stucco and/or gypsum slurries.

SUMMARY

The above-listed needs are met or exceeded by the present eductor based mixer for mixing stucco and water, which features a bladeless mixer instead of the conventional rotating impeller technology. In the present assembly, a motive fluid is provided, such as air or water, which carries stucco particles, and eventually mixes together to form the gypsum slurry. When air is the motive fluid, water is delivered upstream of a mixer outlet to form the gypsum slurry. In the present assembly, when air is the motive fluid, the slurry is somewhat atomized by the pressurized air stemming from the turbulent nature of the flow, which promotes flowability and prevents unwanted premature clogging or setting of stray slurry particles. In the embodiment where water is the motive fluid, the air is introduced into the system with the dry stucco particles. In the present system, there are no moving parts, unlike conventional mixer systems. The lack of moving parts helps reduce buildup of gypsum inside the mixer. Besides, gypsum slurry being a shear thinning fluid and the eductor facilitating creation of turbulence, the effective viscosity of the slurry produced by the present system will be lower, and will facilitate improved slurry mixing as well as reducing water demand.

Features of the present system include improved mixing of stucco with water, a stucco mixer requiring less maintenance than conventional impeller-based stucco mixers, and having reduced water demand compared to conventional stucco mixing systems. In use, the present system has reduced gypsum slurry water:stucco ratio in the approximate range of 6-40%.

More specifically, the present invention provides a mixing assembly including a source of pressurized air; a main flow conduit having an inlet end and an opposite outlet, the source of pressurized air at the inlet end, a container of stucco in fluid communication with the flow conduit, and a source of water in fluid communication with the flow conduit between the outlet and the container. The pressurized air draws stucco from the container into the flow conduit, and also draws water into the flow conduit to form an atomized slurry.

In another embodiment, a stucco slurry mixing system is provided including a source of pressurized motive fluid, a container of dry particulate in fluid communication with the source of pressurized motive fluid using an eductor such that the dry particulate is drawn into a flow conduit of the pressurized fluid as the fluid passes the container. An outlet is provided at one end of the flow conduit; and a source of liquid is in communication with the flow conduit at a junction located between the outlet and the container.

In the latter embodiment, the preferred motive fluid is water, and air is supplied to the system mixed with the dry, particulate.

In still another embodiment, a building panel is provided that is made using a slurry created using a mixing assembly. The mixing assembly includes a source of pressurized motive fluid, a container of dry particulate in fluid communication with the source of pressurized fluid through an eductor.

DETAILED DESCRIPTION

Figure 1:
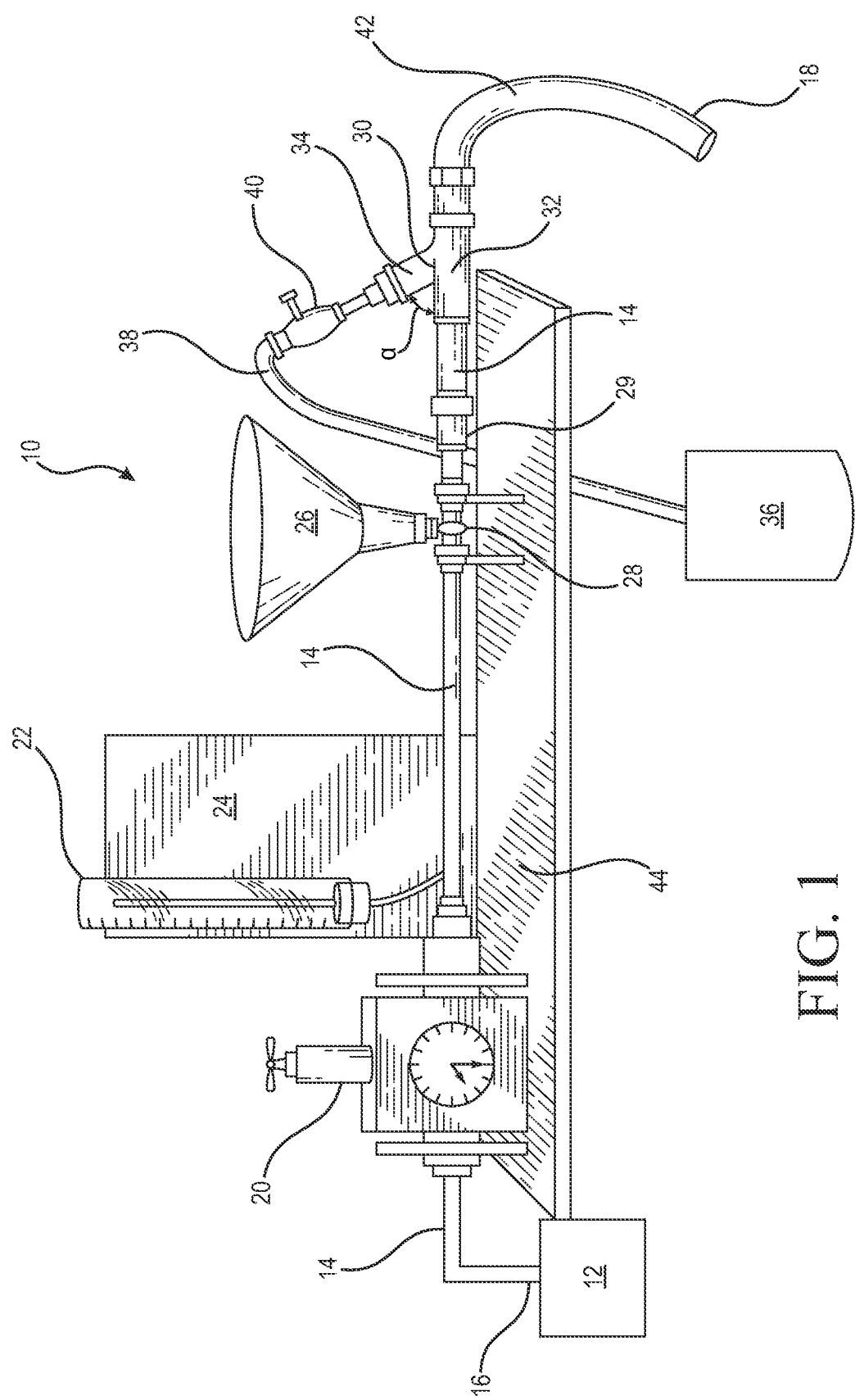
FIG. 1 is a side schematic view of a first embodiment of the present mixer system.

Referring now to FIG. 1, a schematic is presented of the present eductor based mixer system, generally designated 10. As depicted, the system is laboratory based, but is contemplated as being readily convertible to production use with larger scale components. A compressor 12 provides a source of pressurized motive fluid, in this case air, to a flow conduit 14, having an inlet end 16 connected to and in fluid communication with the compressor 12, and an opposite outlet 18. In the present embodiment, the flow conduit 14 is a tube or pipe suitable for carrying pressurized air, particulate matter and liquid, and may be assembled using multiple sections fitted together as is well known in the art.

Downstream of the compressor, an adjustable pressure regulator 20 is preferably mounted in fluid communication with the flow conduit 14 for maintaining the pressure in the conduit within desired values. In one embodiment, the compressor 12 has an output of 20-80 psi, and the regulator 20 is set at approximately 60 psi. It is contemplated that the setting of the regulator 20, and the output of the compressor 12 may vary to suit the situation.

A flow meter 22 is optionally connected to, and in fluid communication with the flow conduit 14 and is preferably mounted on a generally vertical support panel 24 or other substrate for proper operation. Next, the flow conduit 14 is connected to, and is in fluid communication with a container of particulate matter 26, such as a hopper or the like filled with dry stucco, optionally provided with other dry ingredients, including but not limited to starches, clays, setting agents, accelerators, set retarders, perlite, cellulose and other dry additives well known to practitioners in the wallboard formulation art. Examples of such formulations are disclosed in, among others, U.S. Pat. Nos. 4,009,062; 5,922,447; 8,197,952 and 8,618,445, all of which are incorporated by reference.

In the preferred embodiment, the container 26 is connected to the flow conduit 14 using an eductor fitting 28, configured to receive dry particulates by gravity feed from the container. The pressurized air flow in the flow conduit 14 draws or sucks the particulates into the air flow from the container 26. Downstream of the eductor fitting 28, a diffuser 29 with an increased diameter relative to the eductor slows the velocity of the pressurized air and stucco particles. For example, the internal diameter of the flow conduit at the eductor is approximately ½ inch, and at the diffuser 29 is approximately ¾ inch. Next, or downstream of the diffuser 29, a Wye fitting, or junction 30 is connected to and is in fluid communication with the flow conduit 14. The reduced velocity of the pressurized air and particles downstream of the diffuser 29 facilitates the mixing which occurs at the junction 30. The junction 30 includes a first leg 32 in line with the flow conduit 14. A second leg 34 defines an acute angle α with the first leg 32. In other words, the angle α is less than 90° in relation to a longitudinal axis defined by the flow conduit 14. While a variety of acute angles are contemplated, in the preferred embodiment, α is approximately 40°.

A supply of liquid 36, preferably water, is provided under pressure or via gravity feed to the second leg 34 via a feed tube 38. While a container is depicted for the supply 36, it is contemplated that the liquid source could be a conventional tap water source. A suitable control valve 40 is provided in fluid communication with the feed tube 38 and the second leg 34 for controlling the liquid flow as needed. It is important that the liquid be added to the flow conduit 14 between the outlet 18 and the container 26 to prevent the liquid from flowing backward to prematurely mix with the particulate compounds in the container. Such unwanted mixing could cause setting and/or clogging of the eductor or Tee fitting 28 or the flow conduit 14. It is contemplated that the selection of the angle α promotes the flow of the liquid towards the outlet 18. At the outlet 18, an optional flexible tube section 42 is used for directing the flow of the resulting pressurized, and atomized slurry. It is contemplated that the present system 10 is usable for producing a variety of cementitious or settable slurries, including but not limited to gypsum slurries used for producing wallboard and other building panels.

In the present system 10, air runs through the flow conduit 14, and the eductor 28 creates a suction force, which pulls the stucco particles from the container 26 incorporates them into the flow of pressurized air and once the flow reaches the junction 30, the air and stucco eventually mix with the water from the tube 38 to form an atomized slurry as shown in FIG. 1. As shown, the system 10 is mounted on a substrate 44 such as a table or the like, but it is contemplated that other substrates are suitable, depending on the scale of the assembly 10.

Figure 2:
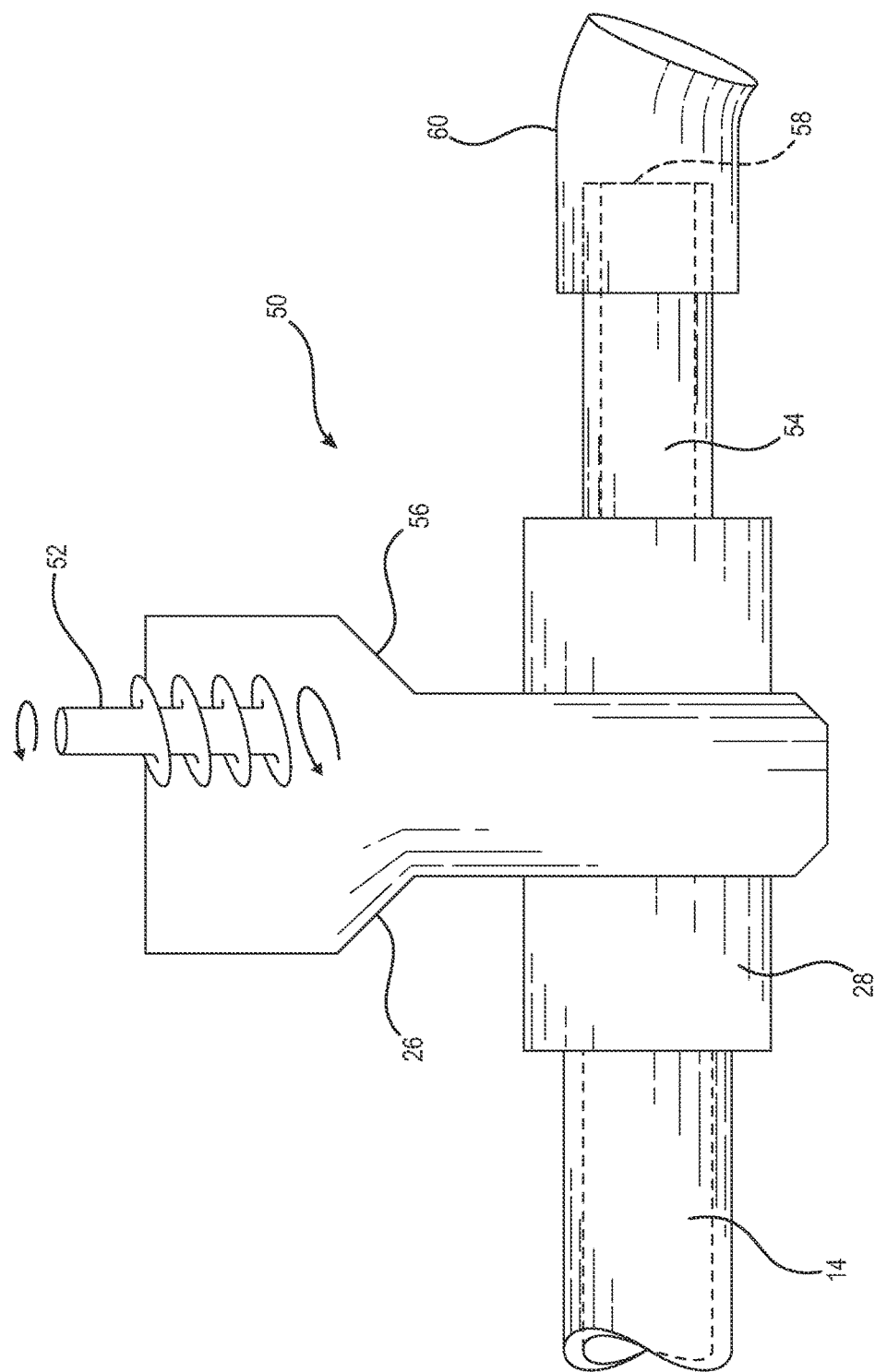
FIG. 2 is a side schematic view of a second embodiment of the present mixer system.

Referring now to FIG. 2, a second embodiment of the present mixing system is generally designated 50. Components shared with the system 10 are designated with identical reference numbers. It has been found that under some circumstances, the system 10 is susceptible to back pressure created by the water stream supplied through the water feed tube 38. Such back pressure has been found to lead to premature mixing with water and setting of the slurry, which causes unwanted clogging. As is known in the art, stucco is relatively fast setting, in many cases setting begins within 10 seconds of contact with water.

A main difference between the embodiments 10 and 50 is that the latter uses water as the motive fluid, replacing air, used in the former. Water is provided under pressure in the flow conduit 14, which is connected to the eductor or eductor fitting 28. In the present embodiment, the eductor 28 is a 1¼ inch NPT eductor, however other sizes are contemplated depending on the application, including, but not limited to ½ inch NPT.

In the hopper 26, it is preferred that a mixer 52, such as a rotating helical or screw mixer is used to stir the particulate stucco, causing turbulence such that air is incorporated with the stored particulate. Similar to the embodiment 10, as the motive fluid in the flow conduit 14 passes the eductor 28, a vacuum is created and the particulate and air is drawn into the flow of motive fluid. As a result, the particulate stucco, the air and water mixes together in a mixing chamber 54. The mixing chamber 54 is relatively short compared to the length of the conduit 14, and has a length in the general range of 1-2 inches. In the preferred embodiment, the mixing chamber 54 has a diameter:length ratio of 1:2, however other ratios are contemplated. The shorter mixing chamber 54 provides for rapid mixing of the slurry.

It has been found that the entrained air, once mixed with the flow of motive fluid, significantly enhances shear in the mixing chamber 54, resulting in a more uniform mixing of particulate and water. Further, the increased shear provided by the entrained air reduces the viscosity of the slurry without requiring additional water. As such, the water:stucco ratio of the resulting slurry was 75:1, without the use of any dispersant or retarder, using a ½ inch NPT eductor. This ratio relatively lower than slurries created with conventional pin-type mixers, where water:stucco ratios typically range between 80-100. It is contemplated that modifications to the hopper 26, particularly in a lower region 56 where the geometry of the hopper narrow abruptly, and combined with the use of dispersants and/or retarders as known in the art, the water:stucco ratio is contemplated to be reduced in the general range of 50.

At an outlet 58 of the mixing chamber 54 is connected a slurry delivery conduit 60, which in one embodiment is a flexible hose for delivery to a wallboard fabrication conveyor line, well known in the art.

It will be seen that the present mixer system 10, 50 is usable as a replacement for a traditional rotary impeller mixer in the production of gypsum wallboard panels or other gypsum-based structural panels, boards, tiles and the like, collectively referred to as building panels. Processes and ingredients of such products are well known in the art, and representative patents are listed above and incorporated by reference herein. A construction panel made from the slurry produced by the present mixer includes upper and lower layers of face paper sandwiching a thickness of set slurry produced as described above. The present system 10, 50 is used for creating the initial gypsum slurry that forms the primary component of such products.

While a particular embodiment of the present eductor based mixer for mixing stucco and water has been described herein, it will be appreciated by those skilled in the art that changes and modifications may be made thereto without departing from the invention in its broader aspects and as set forth in the following claims.

The invention claimed is:

1. A stucco slurry mixing system, comprising:
    a main flow conduit having an inlet end and an opposite outlet;
    a source of pressurized air at said inlet end;
    a container of stucco and entrained air in fluid communication with said main flow conduit, said container having an internal mixer;
    an eductor fitting in fluid communication with said main flow conduit and said container of stucco so that said pressurized air draws stucco and entrained air from said container into said main flow conduit via vacuum, to form a slurry;
    a mixing chamber connected directly to an outlet of said eductor; and
    a source of water in communication with said main flow conduit at a junction between said outlet of said main flow conduit and said container, such that the water mixes in said mixing chamber with the stucco and the entrained air for promoting shear in said mixing chamber; and
    said mixing chamber having a length between 1 to 2 inches and a diameter:length ratio of approximately 1:2.

2. A stucco slurry mixing system constructed and arranged for producing a stucco slurry, the system including:
    a main flow conduit having an inlet end and an opposite outlet;
    a source of pressurized water at said inlet end;
    a container of particulate stucco and entrained air in fluid communication with said main flow conduit using an eductor fitting such that the particulate stucco and the entrained air is drawn into the pressurized water via a vacuum; and
    a mixing chamber in fluid communication with said eductor fitting constructed and arranged to define a space for enhancing mixing of the water, stucco and the entrained air to form a slurry, said mixing chamber having a length between 1 to 2 inches and a diameter:length ratio of approximately 1:2 for promoting shear in said mixing chamber for enhancing slurry formation and mixing; and
    said mixing chamber constructed and arranged for formulating a slurry having a water:stucco ratio of approximately 75:1 and for inhibiting premature setting of the slurry.

* * * * *